United States Patent
Sergeyev et al.

(10) Patent No.: US 9,357,513 B2
(45) Date of Patent: May 31, 2016

(54) USER EQUIPMENT REALLOCATION BETWEEN NODES

(71) Applicant: INTEL IP CORPORATION, Santa Clara, CA (US)

(72) Inventors: Vadim Sergeyev, Nizhny Novgorod (RU); Jong-Kae Fwu, Sunnyvale, CA (US); Alexei Davydov, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 101 days.

(21) Appl. No.: 14/332,661

(22) Filed: Jul. 16, 2014

(65) Prior Publication Data

US 2015/0043404 A1 Feb. 12, 2015

Related U.S. Application Data

(60) Provisional application No. 61/863,902, filed on Aug. 8, 2013.

(51) Int. Cl.

| | |
|---|---|
| *H04W 4/00* | (2009.01) |
| *H04W 56/00* | (2009.01) |
| *H04L 5/14* | (2006.01) |
| *H04W 52/02* | (2009.01) |
| *H04W 76/04* | (2009.01) |
| *H04W 36/08* | (2009.01) |
| *H04W 72/08* | (2009.01) |

(Continued)

(52) U.S. Cl.
CPC ............ *H04W 56/0005* (2013.01); *H04L 5/14* (2013.01); *H04W 4/005* (2013.01); *H04W 36/08* (2013.01); *H04W 36/28* (2013.01); *H04W 52/0206* (2013.01); *H04W 52/0209* (2013.01); *H04W 72/082* (2013.01); *H04W 76/02* (2013.01); *H04W 76/023* (2013.01); *H04W 76/046* (2013.01); *H04W 4/023* (2013.01); *H04W 36/14* (2013.01); *H04W 72/0406* (2013.01); *H04W 72/0446* (2013.01)

(58) Field of Classification Search
None
See application file for complete search history.

(56) References Cited

U.S. PATENT DOCUMENTS

2015/0063295 A1* 3/2015 Himayat ........... H04W 36/0022
370/331

FOREIGN PATENT DOCUMENTS

| KR | 10-2007-0079944 A | 8/2007 |
|---|---|---|
| KR | 10-2011-0005786 A | 1/2011 |

(Continued)

OTHER PUBLICATIONS

Arnold et al, Power Consumption Modeling of Different Base Station Types in Heterogeneous Cellular Networks, Future Network MobileSummit, 8 pages, 2010.*

(Continued)

*Primary Examiner* — Frank Duong
(74) *Attorney, Agent, or Firm* — Thorpe North & Western LLP

(57) ABSTRACT

A technology for a power management module that is operable to reduce power consumption in a communications network. A resource availability of one or more evolved node B (eNode Bs) in the communications network can be determine to receive data traffic of a plurality of user equipment (UEs) in communication with a serving eNode B. A power consumption rate of the communications network can be calculated when the serving eNode B is placed in a power saving mode. The serving eNode B can be switched to a power savings mode when the resource availability of the one or more eNode Bs enables the plurality of UEs to be handed over from the serving eNode B to selected eNode Bs of the one or more eNode Bs.

22 Claims, 6 Drawing Sheets

(51) Int. Cl.
*H04W 76/02* (2009.01)
*H04W 36/28* (2009.01)
*H04W 72/04* (2009.01)
*H04W 4/02* (2009.01)
*H04W 36/14* (2009.01)

(56) References Cited

FOREIGN PATENT DOCUMENTS

| KR | 10-2011-0083231 A | 7/2011 |
|---|---|---|
| KR | 10-2012-0113779 A | 10/2012 |

OTHER PUBLICATIONS

Auer et al, How Much Energy is Needed to Run a Wireless Network?, downloadable at https://www.ict-earth.eu, 24 pages, 2012.*
PCT Application PCT/US2014/049560; filed Aug. 4, 2014; Intel IP Corporation et al.; International Search Report mailed Nov. 18, 2014.
Huawei et al.; New Study Item Proposal for Small Cell Enhancments for E-UTRA and E-UTRAN—Physical-layer Aspects; 3GPP TSG-RAN Meeting #58; RP-122032; Dec. 4-7, 2012; 10 pages; Barcelona, Spain.
NTT DOCOMO et al.; Base Station Power Model; TSG-RAN WG1 #67; R1-114336; Nov. 14-18, 2011; 5 pages; San Francisco, USA.

* cited by examiner

USER EQUIPMENT REALLOCATION BETWEEN NODES

RELATED APPLICATIONS

This application claims the benefit of and hereby incorporates by reference U.S. Provisional Patent Application Ser. No. 61/863,902, filed Aug. 8, 2014.

BACKGROUND

Increased use of mobile devices, such as smartphones and tablets, with an expanding number of wireless services offered on the devices, such as streaming video, have placed increased data loads and throughput requirements on wireless networks. To handle the increasing amount of wireless services to an increasing numbers of users, various multiple antenna techniques can be employed in wireless network environments to meet the increasing data and throughput demands.

In homogeneous networks, transmission stations, also called macro nodes, can provide basic wireless coverage to mobile devices. The geographical coverage area for each node can be referred to as a cell. The geographical coverage area of a macro node can be referred to as a macro cell. Heterogeneous networks (HetNets) were introduced to handle increased traffic loads on the macro nodes due to increased usage and functionality of mobile devices. HetNets can include a layer of planned high power macro nodes (or macro eNode Bs) overlaid with layers of lower power nodes (micro-nodes, pico-nodes, femto-nodes, home-nodes, relay stations, etc.) that can be deployed in a less organized or uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and to improve indoor coverage where building structures impede signal transmission.

As the number of communications networks increases, as well as the geographical coverage of the wireless cellular networks using HetNets, energy efficiency is becoming an increasingly important aspect of communications networks, such as HetNets. However, nodes in communications systems were not built specifically for energy efficiency. Additionally, there are increasingly more and more applications on user equipment (UEs) using always-on connections to a serving application in the network. In one example, UE applications such as a social networking application, a voice over internet protocol (VOIP) application, or a location service application may generate background traffic even when the UE or the application is not in active use. The background traffic from these applications may include packets of relatively small size, which may be sent intermittently.

Reducing a number of active nodes used in a communications networks, such as a HetNet, can be used to reduce an overall power consumption in a communications network. However, maintaining UE connectivity, including connectivity for UE background traffic and always on applications, makes reducing the number of nodes in a communications network difficult. Accordingly, there is a need to improve an efficiency of saving energy in communication networks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
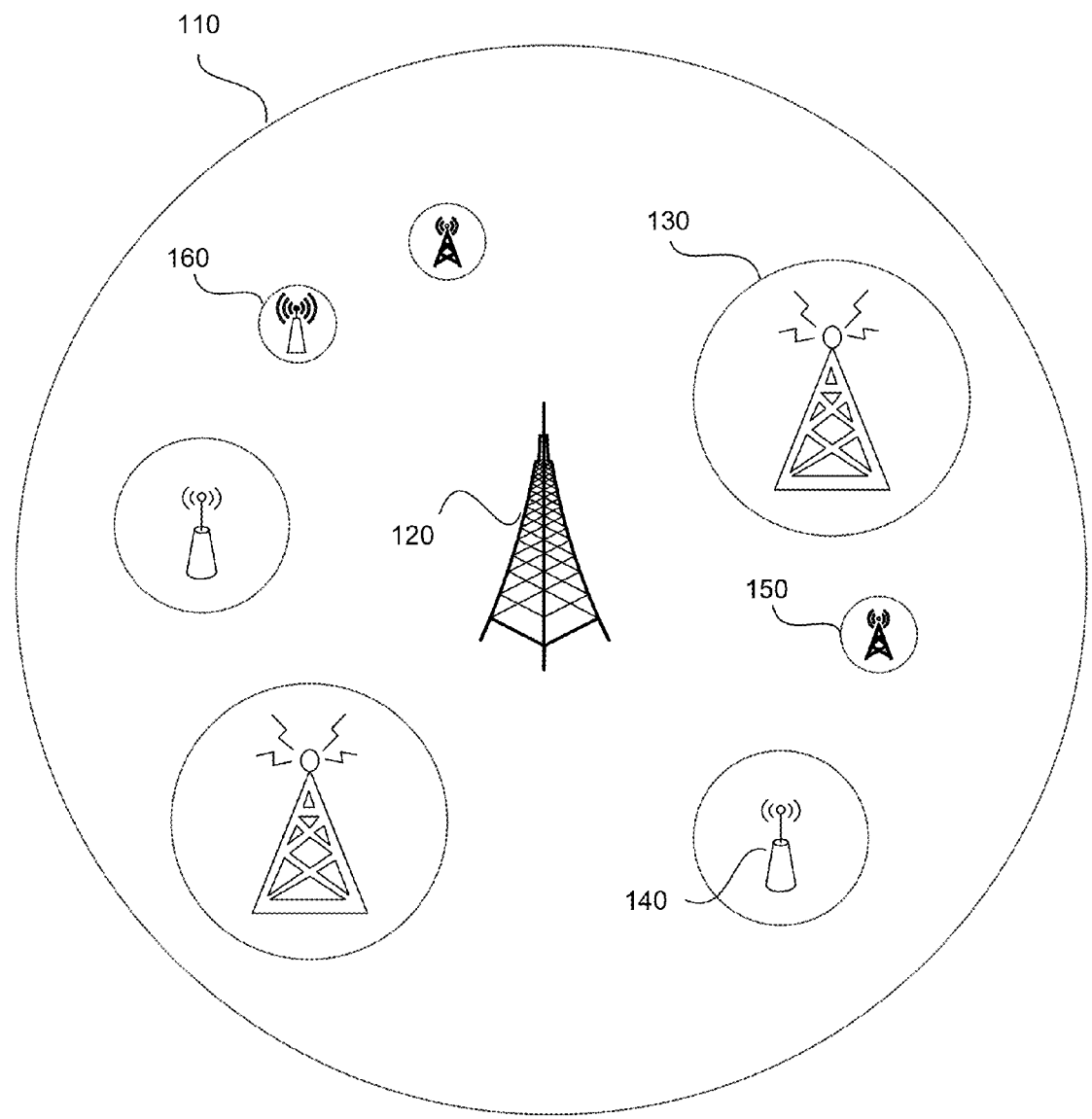
FIG. 1 depicts a multiple radio access technology (multi-RAT) heterogeneous networks (HetNet) with a macro-cell and a macro-node overlaided with layers of lower power nodes or small cell (SC) nodes in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

FIG. 1 depicts a multiple radio access technology (multi-RAT) heterogeneous networks (HetNet) with a macro-cell 110 and a macro-node 120 overlaided with layers of lower power nodes or small cell (SC) nodes including micro-nodes 130, pico-nodes 140, femto-nodes 150, and wireless local area network (WLAN) access points (APs) 160. In one embodiment, the WLAN APs can operate based on a standard such as the Institute of Electronics and Electrical Engineers (IEEE) 802.11-2012, IEEE 802.11ac, or IEEE 802.11ad standard. Other wireless standards for wireless networks configured to operate in unlicensed portions of the radio spectrum, such as Bluetooth, can also be used in a multi-RAT HetNet.

Radio links are often shared amongst multiple users, where the network selection by each user equipment (UE) is based only on maximizing the throughput performance of the UE. The self-maximizing network selection of each UE can cause undesirable overall user and system performance and power consumption. In one example, a UE may excessively switch back and forth between different radio networks causing a significant gap between actual performance and optimal achievable performance of the user and the system and wastefully using power.

SC node on/off techniques can be used to manage interference and power consumption in a HetNet with small cells while maintaining UE connectivity. In one embodiment, one SC node on/off technique can be that when a SC evolved node B (SC-eNode B) does not have any UEs associated with the SC-eNode B or when the SC-eNode B is not communicating any data with associated UEs, the SC-eNode B can be switched off without impacting the UE connectivity. In this technique, the communications network power consumption and interference within the communications network can be reduced without negatively affecting the performance of other eNode Bs and/or UEs in the communications network. However, this technique can be less effective when the communications network requires that the SC node on/off technique not impacting UE connectivity, as SC-eNode Bs can often be prevented from being turning off as UEs associated with the SC-eNode Bs can continually communicate small amounts of traffic (low loaded SC-eNode Bs), such as when UEs use always on applications or applications that run in the background.

Figure 2A:
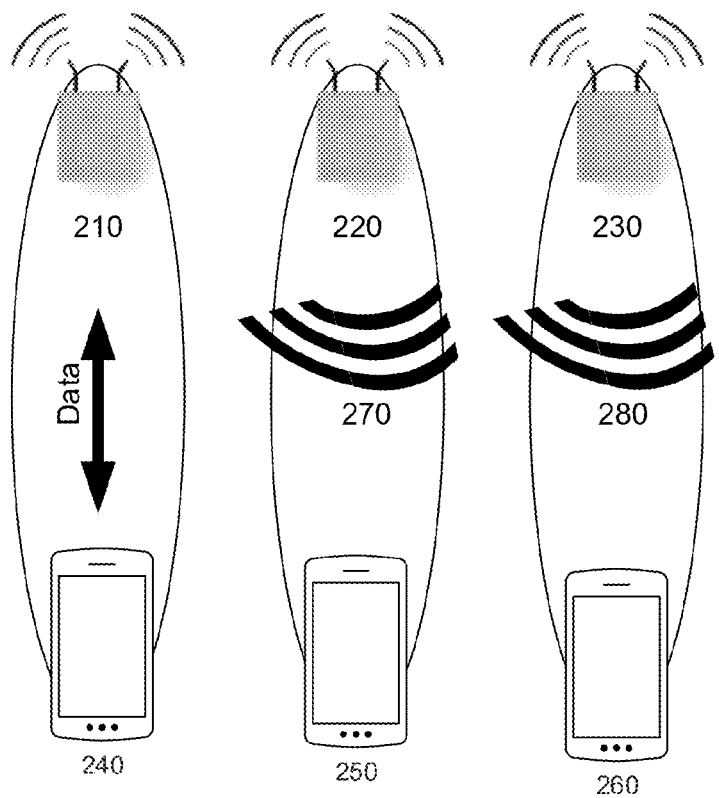
FIG. 2a depicts a plurality of SC evolved node Bs (SC-eNode Bs) that each have an associated UE communicating low loading data traffic in accordance with an example.

Another SC node on/off technique can include UE reallocation between the SC nodes to free up the SC-eNode Bs from the reallocated UEs to be turned off. FIG. 2A shows SC-eNode Bs 210, 220, and 230 that each have an associated UE 240, 250, and 260. In one embodiment, SC-eNode B 210 communicates data with UE 240 and SC-eNode Bs 220 and 230 communicate low loading data traffic with UEs 250 and 260, e.g. UE 250 and 260 have ongoing VoIP calls. FIG. 2a further illustrates that to support each associated UE connectivity, the SC-eNodes Bs 220 and 230 each transmit reference signals 270 and 280, such as cell specific reference (CRS) signals. Traditionally, when the SC-eNode Bs transmitting various reference signals, the transmitted reference signals can produce interference with communications in neighboring cells in a communications network. Additionally, SC-eNode Bs 210, 220, and 230 each supporting the associated UEs 240, 250, and 260 can require using power for transmitting data, receive data, processing data, running schedulers, and so forth.

Figure 2B:
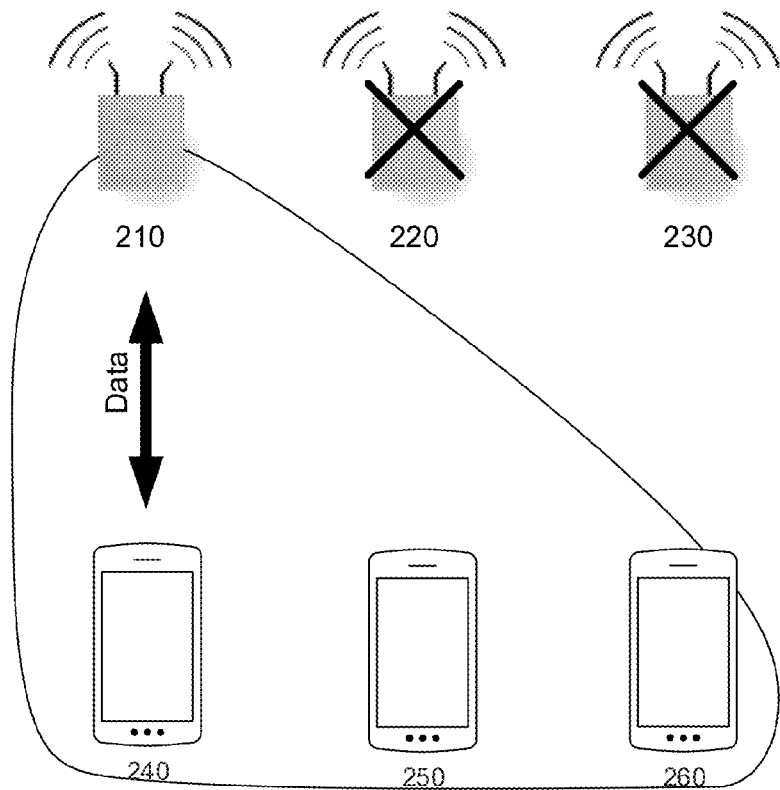
FIG. 2b depicts a plurality of UEs reallocated or handed over to a SC-eNode B in accordance with an example.

FIG. 2B shows that UEs 250 and 260 are reallocated or handed over to the SC-eNode B 210. In one embodiment, when UEs 250 and 260 are reallocated or handed over to the SC-eNode B 210, the SC-eNode Bs 220 and 230 can be switched off or put in a sleeping mode. In another embodiment, SC-eNode Bs 220 and 230 can be switched off or put in a sleeping mode to reduce an overall power consumption of the communications network and eliminate unnecessary transmissions of the reference signals to reduce interference in the communications network. In another embodiment, UEs 250 and 260 can be reallocated or handed over to the SC-eNode B 210 based on an overall reduction of power consumption in the communications network. In another embodiment, SC-eNode B 210 can continue to communicate data with UE 240.

In one embodiment, a power consumption of an eNode B can be determined using a relation between a relative radio frequency (RF) output power ($P_{out}$) and a power consumption of an eNode B (Pin) calculated using:

$$P_{in} = \begin{cases} N_{CC}N_{sec} \cdot (P_0 + \Delta_p P_{max} \chi), & 0 < \chi \leq 1 \\ N_{CC}N_{sec} \cdot P_{sleep}, & \chi = 0 \end{cases}, \quad (1)$$

where $P_0$ is a power consumption at a minimum non-zero output power of the communications network, $P_{max}$ is a maximum RF output power per component carrier (CC) or eNode B of the communications network, $\Delta_p$ is a slope of a load dependent power consumption of the communications network, $N_{sec}$ is a number of sectors per site, $N_{CC}$ is a number of CCs in the communications network, $0 \leq \chi \leq 1$ is a load of a eNode B which is measured based on the percentage of resource elements (REs) transmitted and on a corresponding power boosting level. In one embodiment, the power boosting level can be determined using:

$$\chi = \frac{\sum_{k=0}^{12N_{RB}^{DL}} n(k)_{RE}^{DL} \cdot p_k}{12N_{RB}^{DL}}, \quad (2)$$

where $$\sum_{k=0}^{12N_{RB}^{DL}} n(k)_{RE}^{DL} \cdot p_k \leq 12N_{RB}^{DL},$$

$n(k)_{RE}^{DL}$ is either 0 or 1 based on if a RE k is used or not, and $p_k$ is the power boosting used for RE k. In one embodiment, the RF output power, $P_{out} \leq P_{max}$, can account for a radiated power of one sector.

In one embodiment, the power consumption of the communications network can be determined using field measurements of SC-eNode Bs used by a cellular operator. In another embodiment, to reduce a power consumption of a network for a deployment of N similar SC-eNode Bs, a selected number of eNode Bs can be switched off while maintaining a substantially same amount of total traffic from UEs in the communications network (i.e. maintain the UE connectivity). In another embodiment, the communications network can determine when one or more SC-eNode Bs have available resources to accommodate UE traffic of a selected eNode B. In another embodiment, the communications network can determine one or more SC-eNode Bs have available resources to accommodate a substantially same data rate of UEs of the selected eNode B, i.e. no substantial data rate degradation happens when a UE camps on one of the one or more SC-eNode Bs or is handed over to one of the one or more SC-eNode Bs.

In one embodiment, when the communications network determines one or more SC-eNode Bs have available resources to accommodate UE traffic of the selected eNode B and the one or more SC-eNode Bs have available resources to accommodate a substantially same data rate of UEs of the selected eNode B, a network device can determine a power consumption of the communications network before one or more UEs are handed over to the one or more SC eNode Bs and the selected eNode B is switched off, using:

$$\sum_{i=1}^{N-1} P_{0,i} + \left(\sum_{i=1}^{N} \chi_i \Delta_{p,i} P_{max,i}\right) + P_{0,serv}, \quad (3)$$

where N is a number of eNode Bs in the communications network, $P_{0,serv}$ is an amount of power consumed by the serving eNode B when the serving eNode B is operating and not communicating data, $P_{0,i}$ is an amount of power consumed by an $i_{th}$ eNode B when the $i_{th}$ eNode B is operating and not communicating data, $\chi_i$ is an amount of time-frequency resources the $i_{th}$ eNode B uses to communicate with a plurality of UEs, $\Delta_{p,i}$ is an amount of power the $i^{th}$ eNode B draws from a power source per unit of power transmitted by the $i^{th}$ eNode B, and $P_{max,i}$ is a maximum amount of power transmitted by the $i^{th}$ eNode B when the $i^{th}$ eNode B is using all the resources of the eNode B to communicate with the plurality of UEs.

In another embodiment, the network device can determine a power consumption of the communications network after one or more UEs are handed over to the one or more SC eNode Bs and the selected eNode B is switched of using:

$$\sum_{i=1}^{N-1} P_{0,i} + \left(\sum_{i=1}^{N-1} \chi_{i,new} \Delta_{p,i} P_{max,i}\right) + P_{sleep}, \quad (4)$$

where $\chi_{i,new}$ is an amount of time-frequency resources the $i_{th}$ eNode B uses to communicate with the plurality of UEs after the plurality of UEs is handed over from the serving eNode B to the one or more eNode Bs and $P_{sleep}$ is an amount of power consumed by the serving eNode B when operating in a sleep mode.

In one embodiment, when there is no data rate degradation of the UE data from handover the one or more UEs to the one or more eNode Bs, then:

$$\sum_{i=1}^{N-1} P_{0,i} + \left(\sum_{i=1}^{N} \chi_i \Delta_{p,i} P_{max,i}\right) = \sum_{i=1}^{N-1} P_{0,i} + \left(\sum_{i=1}^{N-1} \chi_{i,new} \Delta_{p,i} P_{max,i}\right), \quad (5)$$

In one embodiment, based on equation 5, a power savings of the communications network can be determine using:

$$\Delta P = P_{0,serv} - P_{sleep}, \quad (6)$$

In one example, a power saving of a communications network can be $P_0 - P_{sleep}$ when one or more active SC-eNode Bs neighboring the selected SC-eNode B have available resources to receive all the UEs of the selected SC-eNode B in the communications network. In another example, when all the active SC-eNodes Bs neighboring the selected SC-eNode B do not have available resources to receive all the UEs of the selected SC-eNode B in the communications network, when the selected SC-eNode B is switched off, a power loss of the communications network may be equal to $P_{sleep}$.

In one embodiment, an optimal number of active SC-eNode Bs in a communications network for a reduction of power consumption can be reached when a number of SC-eNode Bs in an on state or sleeping mode is minimal and the resources of the active SC-eNode Bs are all substantially being used. Traditionally, SC node on/off techniques redistribute UE traffic between eNode Bs in a communications network to maximize a throughput of the communications network. One disadvantage of basing SC node on/off techniques on maximizing a throughput of the communications network can be all the eNodes Bs in the communications network are active. One advantage of a power consumption reduction based SC node on/off technique can be a switching off of SC-eNode Bs to reduce a power consumption of the communications network without impacting a throughput of the communications network. Another advantage of a power consumption reduction based SC node on/off technique can be to balance a throughput of the communications network with a power consumption of the communications network.

Figure 3:
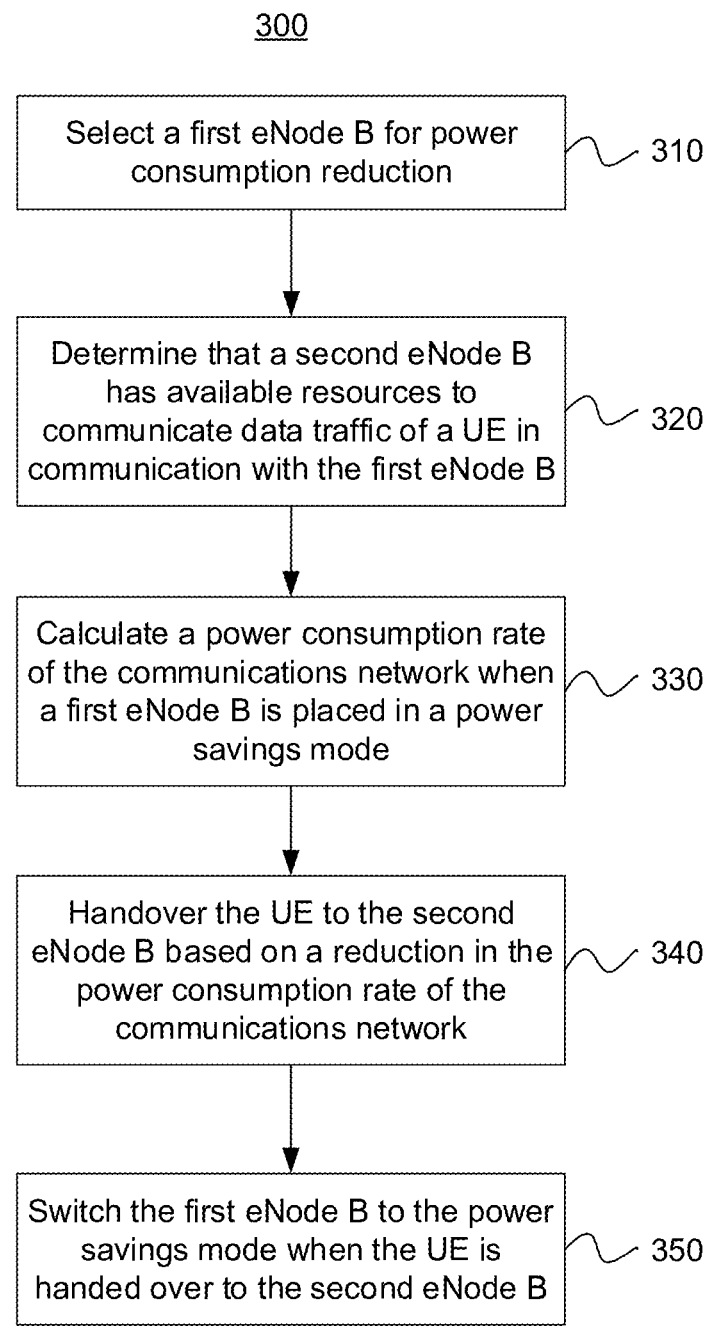
FIG. 3 depicts the functionality of computer circuitry of a network device operable to reduce power consumption in a communications network in accordance with an example.

FIG. 3 uses a flow chart 300 to illustrate the functionality of one embodiment of the computer circuitry of a network device operable to reduce power consumption in a communications network. The functionality may be implemented as a method or the functionality may be executed as instructions on a machine, where the instructions are included on at least one computer readable medium or one non-transitory machine readable storage medium. In one embodiment, the computer circuitry can be configured to select a first evolved node B (eNode B) for power consumption reduction, as in block 310. In another embodiment, the computer circuitry can be further configured to determine that a second eNode B has available resources to receive data traffic of a user equipment (UE) in communication with the first eNode B, as in block 320. In another embodiment, the computer circuitry can be further configured to calculate a power consumption rate of the communications network when a first eNode B is placed in a power savings mode, as in block 330. In another embodiment, the computer circuitry can be further configured to handover the UE to the second eNode B based on a reduction in the power consumption rate of the communications network, as in block 340. In another embodiment, the computer circuitry can be further configured to switch the first eNode B to the power savings mode when the UE is handed over to the second eNode B, as in block 350.

In one embodiment, the computer circuitry can be configured to calculate the power consumption rate of the communications network by comparing an amount of power consumed by the communications network before UE traffic is reallocated to the second eNode B with an amount of power consumed by the communications network after UE traffic is reallocated to the second eNode B and the first eNode B is switched to power savings mode. In another embodiment, the computer circuitry can be further configured to determine a data rate of the UE when the UE is reallocated to the second eNode B.

In one embodiment, the computer circuitry can be further configured to handover the UE when the data rate of the UE remains within a selected threshold range when the UE is handed over to the second eNode B and the power consumption rate of the communications network decreases by at least a threshold amount. In another embodiment, the computer circuitry can be further configured to continue to maintain the UE connection with the first eNode B when the calculated power consumption rate of the communications network remains above a selected threshold rate. In another embodiment, the computer circuitry can be further configured to turn off the first eNode B or switch the first eNode B to a sleep mode when the first eNode B enters the power savings mode. In another embodiment, the sleep mode is a minimum power operating level of the first eNode B.

Figure 4:
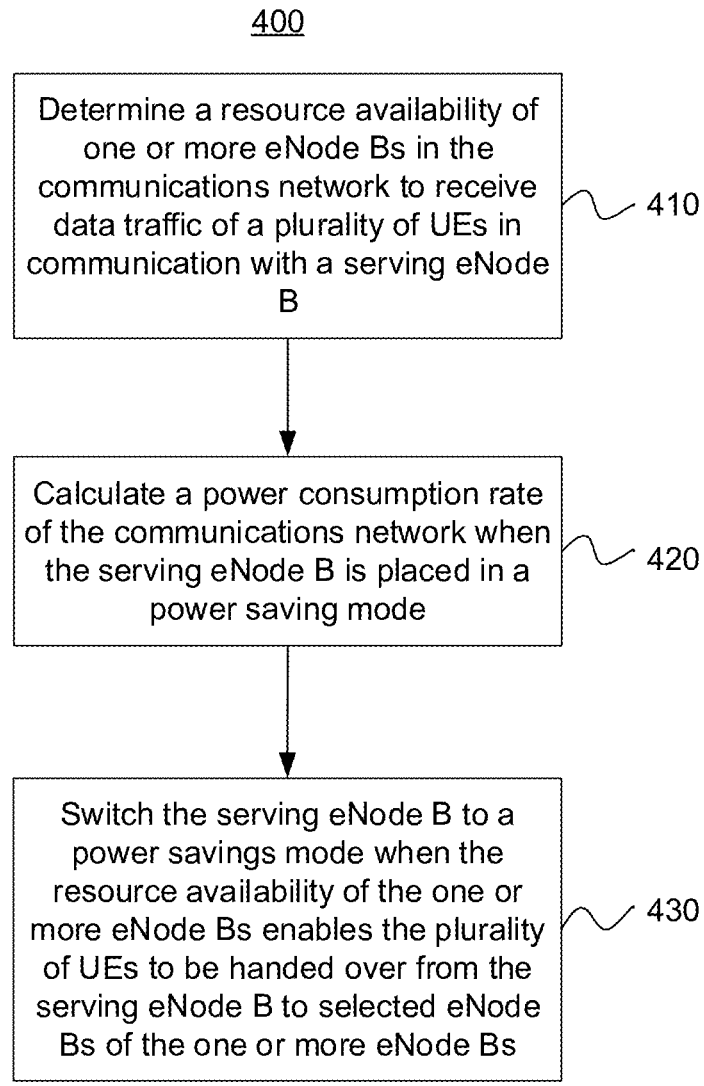
FIG. 4 depicts the functionality of computer circuitry of a power management module operable to reduce power consumption in a communications network in accordance with an example.

FIG. 4 uses a flow chart 400 to illustrate the functionality of one embodiment of the computer circuitry of a power management module operable to reduce power consumption in a communications network. The functionality may be implemented as a method or the functionality may be executed as instructions on a machine, where the instructions are included on at least one computer readable medium or one non-transitory machine readable storage medium. In one embodiment, the computer circuitry can be configured to determine a resource availability of one or more evolved node B (eNode Bs) in the communications network to receive data traffic of a plurality of user equipment (UEs) in communication with a serving eNode B, as in block 410. In another embodiment, the computer circuitry can be further configured to calculate a power consumption rate of the communications network when the serving eNode B is placed in a power saving mode, as in block 420. In another embodiment, the computer circuitry can be further configured to switch the serving eNode B to a power savings mode when the resource availability of the one or more eNode Bs enables the plurality of UEs to be handed over from the serving eNode B to selected eNode Bs of the one or more eNode Bs, as in block 430.

In one embodiment, the computer circuitry can be configured to calculate the power consumption rate of the communications network by comparing an amount of power consumed by the communications network before the serving eNode B is placed in the power saving mode with an amount of power consumed by the network after the serving eNode B is placed in the power saving mode. In another embodiment, the computer circuitry can be further configured to calculate the amount of power consumed by the communications network before the serving eNode B is placed in the power saving mode using:

$$\sum_{i=1}^{N-1} P_{0,i} + \left(\sum_{i=1}^{N} \chi_i \Delta_{p,i} P_{max,i}\right) + P_{0,serv},$$

where N is a number of eNode Bs in the communications network, $P_{0,serv}$ is an amount of power consumed by the serving eNode B when the serving eNode B is operating and not communicating data, $P_{0,i}$ is an amount of power consumed by an $i^{th}$ eNode B when the $i^{th}$ eNode B is operating and not communicating data, $\chi_i$ is an amount of time-frequency resources the $i_{th}$ eNode B uses to communicate with a plurality of UEs, $\Delta_{p,i}$ is an amount of power the $i^{th}$ eNode B draws from a power source per unit of power transmitted by the $i^{th}$ eNode B, and $P_{max,i}$ is a maximum amount of power transmitted by the $i^{th}$ eNode B when the $i^{th}$ eNode B is using all the resources of the eNode B to communicate with the plurality of UEs; and calculate the amount of power consumed by the communications network after the serving eNode B is placed in the power saving mode using:

$$\sum_{i=1}^{N-1} P_{0,i} + \left(\sum_{i=1}^{N-1} \chi_{i,new} \Delta_{p,i} P_{max,i}\right) + P_{sleep},$$

where $\chi_{i,new}$ is an amount of time-frequency resources the $i_{th}$ eNode B uses to communicate with the plurality of UEs after the plurality of UEs is handed over from the serving eNode B to the one or more eNode Bs and $P_{sleep}$ is an amount of power consumed by the serving eNode B when operating in a sleep mode.

In another embodiment, the computer circuitry can be further configured to determine a change in power consumption of the communications network using $P_{0,serv} - P_{sleep}$ when the serving eNode B is switched to the power saving mode. In another embodiment, the computer circuitry can be further configured to reallocate the data traffic of the plurality of UEs from the serving eNode B to the one or more eNode Bs in the communications network when a data rate of each UE in the plurality of UEs remains within a selected threshold range when each UE is reallocated to the one or more eNode Bs and the power consumption rate of the communications network decreases by at least a threshold amount. In another embodiment, the one or more eNode Bs are small cell eNode Bs and the serving eNode B is a small cell eNode B. In another embodiment the one or more eNode Bs and the serving eNode B may include macro eNode Bs, micro eNode Bs, pico eNode Bs, femto eNode Bs, and/or other types of eNode Bs.

Figure 5:
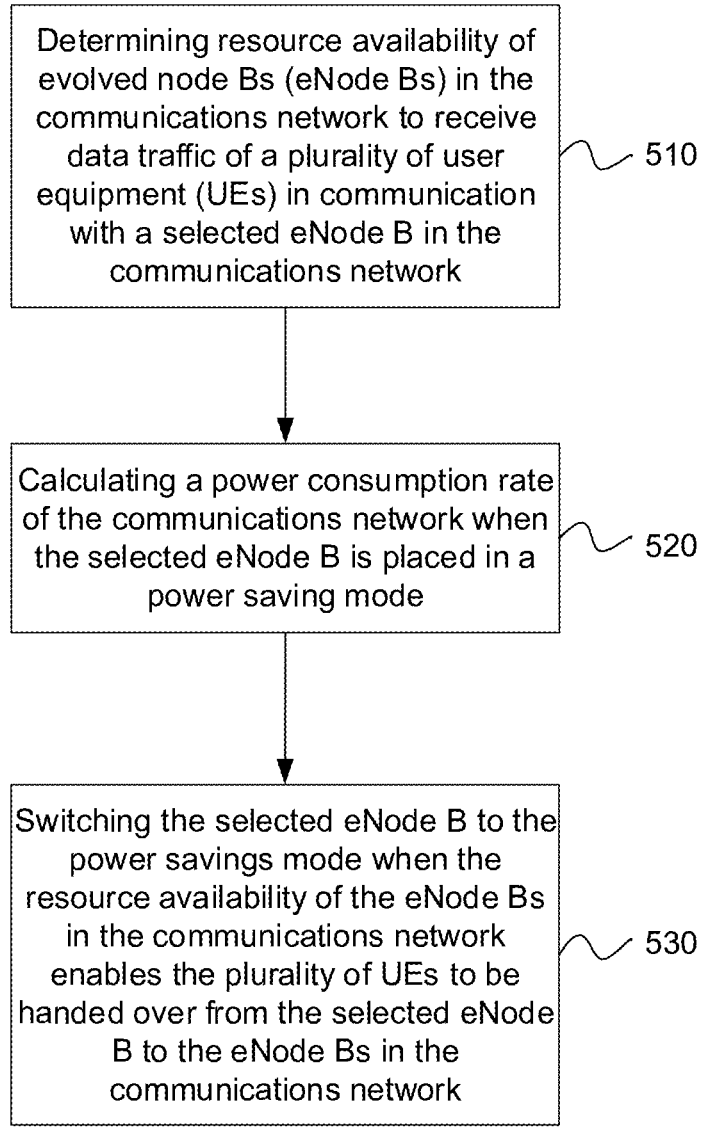
FIG. 5 depicts a product including a non-transitory storage medium having stored thereon instructions that are adapted to be executed to implement a method of reducing power consumption of a communications network in accordance with an example.

Another example provides functionality 500 of product including a non-transitory storage medium having stored thereon instructions that are adapted to be executed to implement a method of reducing power consumption of a communications network, as in the flow chart in FIG. 5. The instructions of the product can be implemented as a method or as instructions on a machine, where the instructions are included on at least one computer readable medium or one non-transitory machine readable storage medium. In one embodiment, the method can comprise determining resource availability of evolved node Bs (eNode Bs) in the communications network to receive data traffic of a plurality of user equipment (UEs) in communication with a selected eNode B in the communications network, as in block 510. In another embodiment, the method can further comprise calculating a power consumption rate of the communications network when the selected eNode B is placed in a power saving mode, as in block 520. In another embodiment, the method can further comprise switching the selected eNode B to the power savings mode when the resource availability of the eNode Bs in the communications network enables the plurality of UEs to be handed over from the selected eNode B to the eNode Bs in the communications network.

In one embodiment, the method can further comprise calculating the power consumption rate of the communications network by comparing an amount of power consumed by the communications network before the selected eNode B is placed in the power saving mode with an amount of power consumed by the network after the selected eNode B is placed in the power saving mode. In another embodiment, the method can further comprise handing over the plurality of UEs to the eNode Bs based on a reduction in the power consumption rate of the communications network. In another embodiment, the method can further comprise handing over the plurality of UEs from the selected eNode B to the eNode Bs in the communications network when a data rate of each UE in the plurality of UEs remains within a selected threshold range when each UE is reallocated to the eNode Bs and the power consumption rate of the communications network decreases by at least a threshold amount.

In another embodiment, the method can further comprise maintaining the UE connection with the selected eNode B when the calculated power consumption rate of the communications network remains above a selected threshold rate. In another embodiment, the method can further comprise dynamically handing over the plurality of UEs to the eNode Bs based on a reduction in the power consumption rate of the communications network to continuously reduce the power consumption rate of the communications network.

In one embodiment, the method can further comprise calculating the amount of power consumed by the network before the selected eNode B is placed in the power saving mode using:

$$\sum_{i=1}^{N-1} P_{0,i} + \left(\sum_{i=1}^{N} \chi_i \Delta_{p,i} P_{max,i}\right) + P_{0,serv},$$

where N is a number of eNode Bs in the communications network, $P_{0,serv}$ is an amount of power consumed by the serving eNode B when the serving eNode B is operating and not communicating data, $P_{0,i}$ is an amount of power consumed by an $i^{th}$ eNode B when the $i^{th}$ eNode B is operating and not communicating data, $\chi_i$ is an amount of time-frequency resources the $i^{th}$ eNode B uses to communicate with a plurality of UEs, $\Delta_{p,i}$ is an amount of power the $i^{th}$ eNode B draws from a power source per unit of power transmitted by the $i^{th}$ eNode B, and $P_{max,i}$ is a maximum amount of power transmitted by the $i^{th}$ eNode B when the $i^{th}$ eNode B is using all the resources of the eNode B to communicate with the plurality of UEs; and calculate the amount of power consumed by the communications network after the serving eNode B is placed in the power saving mode using:

$$\sum_{i=1}^{N-1} P_{0,i} + \left(\sum_{i=1}^{N-1} \chi_{i,new} \Delta_{p,i} P_{max,i}\right) + P_{sleep},$$

where $\chi_{i,new}$ is an amount of time-frequency resources the $i_{th}$ eNode B uses to communicate with the plurality of UEs after the plurality of UEs is handed over from the serving eNode B to the one or more eNode Bs and $P_{sleep}$ is an amount of power consumed by the serving eNode B when operating in a sleep mode.

Figure 6:
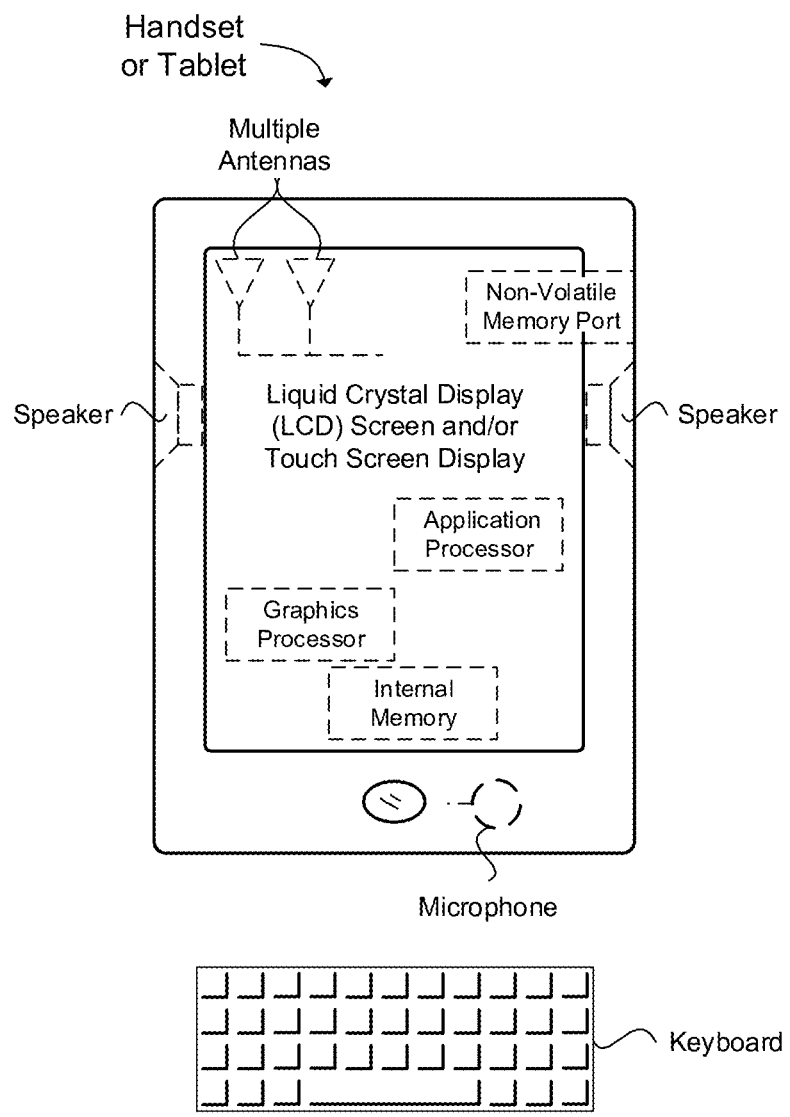
FIG. 6 illustrates a diagram of a UE in accordance with an example.

FIG. 6 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNode B), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the foregoing description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed:

1. A network device configured to reduce power consumption in a communications network, the network device having computer circuitry configured to:
    select a first evolved node B (eNode B) for power consumption reduction;
    determine that a second eNode B has available resources to communicate data traffic of a user equipment (UE) in communication with the first eNode B;
    calculate a power consumption rate of the communications network when a first eNode B is placed in a power savings mode;
    handover the UE to the second eNode B based on a reduction in the power consumption rate of the communications network; and
    switch the first eNode B to the power savings mode when the UE is handed over to the second eNode B.

2. The computer circuitry of claim 1, further configured to calculate the power consumption rate of the communications network by comparing an amount of power consumed by the communications network before UE traffic is reallocated to the second eNode B with an amount of power consumed by the communications network after UE traffic is reallocated to the second eNode B and the first eNode B is switched to power savings mode.

3. The computer circuitry of claim 1, further configured to determine a data rate of the UE when the UE is reallocated to the second eNode B.

4. The computer circuitry of claim 3, further configured to handover the UE when:
    the data rate of the UE remains within a selected threshold range when the UE is handed over to the second eNode B; and
    the power consumption rate of the communications network decreases by at least a threshold amount.

5. The computer circuitry of claim 1, further configured to continue to maintain the UE connection with the first eNode B when the calculated power consumption rate of the communications network remains above a selected threshold rate.

6. The computer circuitry of claim 1, further configured to turn off the first eNode B or switch the first eNode B to a sleep mode when the first eNode B enters the power savings mode.

7. The computer circuitry of claim 6, wherein the sleep mode is a minimum power operating level of the first eNode B.

8. An power management module configured to reduce power consumption in a communications network, the power consumption module having computer circuitry configured to:
    determine a resource availability of one or more evolved node B (eNode Bs) in the communications network to receive data traffic of a plurality of user equipment (UEs) in communication with a serving eNode B;
    calculate a power consumption rate of the communications network when the serving eNode B is placed in a power saving mode; and
    switch the serving eNode B to a power savings mode when the resource availability of the one or more eNode Bs enables the plurality of UEs to be handed over from the serving eNode B to selected eNode Bs of the one or more eNode Bs.

9. The computer circuitry of claim 8, further configured to calculate the power consumption rate of the communications network by comparing an amount of power consumed by the communications network before the serving eNode B is placed in the power saving mode with an amount of power consumed by the network after the serving eNode B is placed in the power saving mode.

10. The computer circuitry of claim 9, further configured to:
    calculate the amount of power consumed by the communications network before the serving eNode B is placed in the power saving mode using:

$$\sum_{i=1}^{N-1} P_{0,i} + \left( \sum_{i=1}^{N} \chi_i \Delta_{p,i} P_{max,i} \right) + P_{0,serv},$$

wherein N is a number of eNode Bs in the communications network, $P_{0,serv}$ is an amount of power consumed by the serving eNode B when the serving eNode B is operating and not communicating data, $P_{0,i}$ an amount of power consumed by an $i^{th}$ eNode B when the $i^{th}$ eNode B is operating and not communicating data, $\chi_i$ is an amount of time-frequency resources the $i_{th}$ eNode B uses to communicate with a plurality of UEs, $\Delta_{p,i}$ is an amount of power the $i^{th}$ eNode B draws from a power source per unit of power transmitted by the $i^{th}$ eNode B, and $P_{max,i}$ is a maximum amount of power transmitted by the $i^{th}$ eNode B when the $i^{th}$ eNode B is using all the resources of the eNode B to communicate with the plurality of UEs; and calculate the amount of power consumed by the communications network after the serving eNode B is placed in the power saving mode using:

$$\sum_{i=1}^{N-1} P_{0,i} + \left( \sum_{i=1}^{N-1} \chi_{i,new} \Delta_{p,i} P_{max,i} \right) + P_{sleep},$$

wherein $\chi_{i,new}$ is an amount of time-frequency resources the $i_{th}$ eNode B uses to communicate with the plurality of UEs after the plurality of UEs is handed over from the serving eNode B to the one or more eNode Bs and $P_{sleep}$ is an amount of power consumed by the serving eNode B when operating in a sleep mode.

11. The computer circuitry of claim 10, wherein the serving eNode B is the $N^{th}$ eNode B of the N eNode Bs in the communications network.

12. The computer circuitry of claim 10, further configured to determine a change in power consumption of the communications network using $P_{0,serv} - P_{sleep}$ when the serving eNode B is switched to the power saving mode.

13. The computer circuitry of claim 8, further configured to reallocate the data traffic of the plurality of UEs from the serving eNode B to the one or more eNode Bs in the communications network when:
   a data rate of each UE in the plurality of UEs remains within a selected threshold range when each UE is reallocated to the one or more eNode Bs; and
   the power consumption rate of the communications network decreases by at least a threshold amount.

14. The computer circuitry of claim 8, wherein the one or more eNode Bs are small cell eNode Bs and the serving eNode B is a small cell eNode B.

15. A product including a non-transitory storage medium having stored thereon instructions that are adapted to be executed to implement a method of reducing power consumption of a communications network, the method comprising:
   determining resource availability of evolved node Bs (eNode Bs) in the communications network to receive data traffic of a plurality of user equipment (UEs) in communication with a selected eNode B in the communications network;
   calculating a power consumption rate of the communications network when the selected eNode B is placed in a power saving mode; and
   switching the selected eNode B to the power savings mode when the resource availability of the eNode Bs in the communications network enables the plurality of UEs to be handed over from the selected eNode B to the eNode Bs in the communications network.

16. The product of claim 15, the method further comprising calculating the power consumption rate of the communications network by comparing an amount of power consumed by the communications network before the selected eNode B is placed in the power saving mode with an amount of power consumed by the network after the selected eNode B is placed in the power saving mode.

17. The product of claim 15, the method further comprising handing over the plurality of UEs to the eNode Bs based on a reduction in the power consumption rate of the communications network.

18. The product of claim 17, the method further comprising handing over the plurality of UEs from the selected eNode B to the eNode Bs in the communications network when:
   a data rate of each UE in the plurality of UEs remains within a selected threshold range when each UE is reallocated to the eNode Bs; and
   the power consumption rate of the communications network decreases by at least a threshold amount.

19. The product of claim 15, the method further comprising maintaining the UE connection with the selected eNode B when the calculated power consumption rate of the communications network remains above a selected threshold rate.

20. The product of claim 15, the method further comprising dynamically handing over the plurality of UEs to the eNode Bs based on a reduction in the power consumption rate of the communications network to continuously reduce the power consumption rate of the communications network.

21. The product of claim 15, the method further comprising:
   calculating the amount of power consumed by the network before the selected eNode B is placed in the power saving mode using:

$$\sum_{i=1}^{N-1} P_{0,i} + \left( \sum_{i=1}^{N} \chi_i \Delta_{p,i} P_{max,i} \right) + P_{0,serv},$$

wherein N is a number of eNode Bs in the communications network, $P_{0,serv}$ is an amount of power consumed by the serving eNode B when the serving eNode B is operating and not communicating data, $P_{0,i}$ an amount of power consumed by an $i^{th}$ eNode B when the $i^{th}$ eNode B is operating and not communicating data, $\chi_i$ is an amount of time-frequency resources the $i_{th}$ eNode B uses to communicate with a plurality of UEs, $\Delta_{p,i}$ is an amount of power the $i^{th}$ eNode B draws from a power source per unit of power transmitted by the $i^{th}$ eNode B, and $P_{max,i}$ is a maximum amount of power transmitted by the $i^{th}$ eNode B when the $i^{th}$ eNode B is using all the resources of the eNode B to communicate with the plurality of UEs; and
   calculating the amount of power consumed by the network after the selected eNode B is placed in the power saving mode using:

$$\sum_{i=1}^{N-1} P_{0,i} + \left( \sum_{i=1}^{N-1} \chi_{i,new} \Delta_{p,i} P_{max,i} \right) + P_{sleep},$$

wherein $\chi_{i,new}$ is an amount of time-frequency resources the $i_{th}$ eNode B uses to communicate with the plurality of UEs after the plurality of UEs is handed over from the serving eNode B to the one or more eNode Bs and $P_{sleep}$ is an amount of power consumed by the serving eNode B when operating in a sleep mode.

22. The product of claim 21, wherein the serving eNode B is the $N^{th}$ eNode B of the N eNode Bs in the communications network.

* * * * *